US012563448B2

(12) United States Patent
Yamamoto

(10) Patent No.: US 12,563,448 B2
(45) Date of Patent: Feb. 24, 2026

(54) MANAGEMENT APPARATUS, RESOURCE MANAGEMENT METHOD, AND NON-TRANSITORY COMPUTER-READABLE STORAGE MEDIUM

(71) Applicant: Canon Kabushiki Kaisha, Tokyo (JP)

(72) Inventor: Tetsuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 17/993,288

(22) Filed: Nov. 23, 2022

(65) Prior Publication Data

US 2023/0189076 A1      Jun. 15, 2023

(30) Foreign Application Priority Data

Dec. 14, 2021      (JP) ................................. 2021-202771

(51) Int. Cl.
*H04W 16/14*      (2009.01)
*H04L 27/26*      (2006.01)
*H04W 28/16*      (2009.01)

(52) U.S. Cl.
CPC .................................. *H04W 28/16* (2013.01)

(58) Field of Classification Search
None
See application file for complete search history.

(56) References Cited

U.S. PATENT DOCUMENTS 11,089,483 B2      8/2021   Kato et al.
11,191,090 B2 *  11/2021   Rao ....................... H04W 16/10

11,330,593 B2 *   5/2022   Furuichi ................. H04W 4/08
11,570,785 B2 *   1/2023   Tanaka ................ H04W 72/542
2015/0319622 A1 * 11/2015   Sun ........................ H04W 16/14
                                                         455/454
2016/0135186 A1 *  5/2016   Sun ........................ H04W 72/56
                                                         370/329
2020/0008087 A1    1/2020   Papaleo
2020/0367063 A1 * 11/2020   Kato ................ H04W 72/0446
2022/0070680 A1 *  3/2022   Furuichi .............. H04W 16/02
2023/0291625 A1 *  9/2023   Furuichi .............. H04W 16/14

FOREIGN PATENT DOCUMENTS

JP          2020-188388 A      11/2020
WO          2020137915 A1       7/2020
WO          2021100411 A1       5/2021

* cited by examiner

*Primary Examiner* — Sithu Ko
(74) *Attorney, Agent, or Firm* — Venable LLP

(57)      ABSTRACT

There is provided a management apparatus configured to manage a sharable frequency resource. The management apparatus performs operations including: acquiring usage condition information on a usage condition for the frequency resource used by a first wireless communication network, and desired condition information on a condition under which a second wireless communication network desires to use the frequency resource; estimating, based on the usage and desired condition information, an impact imposed by the second wireless communication network on the first wireless communication network; determining whether to permit use of the frequency resource corresponding to the desired condition information in the second wireless communication network; and notifying alternative condition information on a usage condition, when the use of the frequency resource is determined to be not permitted.

15 Claims, 12 Drawing Sheets

EXPECTED INTERFERENCE AREA

COMMUNICATION AREA OF BASE STATION 112

BASE STATION 112
35.459196N, 139.636106E

| ID | POSITION (LATITUDE LONGITUDE) | FREQUENCY [MHz] | OUTPUT [dBm] | TIME ZONE | TDD PATTERN |
|----|-------------------------------|-----------------|--------------|-----------|-------------|
| 112 | 35.459196N, 139.636106E | 4600~4700 | 23 | 8:00~19:00 | TDD2 (SEMI-SYNCHRONOUS) |

FIG. 3B

```
Usage request {
[112, 35.459196N, 139.636106E, 4600, 4700, 23, 8:00, 19:00, TDD2]
}
```

FIG. 4

| ID | POSITION (LATITUDE LONGITUDE) | FREQUENCY [MHz] | OUTPUT [dBm] | TIME ZONE | TDD PATTERN |
|----|-------------------------------|-----------------|--------------|-----------|-------------|
| 111 | 35.459189N, 139.636098E | 4700~4800 | 23 | 8:00~19:00 | TDD2 (SEMI-SYNCHRONOUS) |
| 121 | 35.459202N, 139.636112E | 4600~4700 | 24 | CONSTANT | TDD1 (SYNCHRONIZED) |
| 122 | 35.459193N, 139.636123E | 4700~4800 | 27 | 6:00~19:00 | TDD1 (SYNCHRONIZED) |

EXPECTED INTERFERENCE AREA
WHEN FREQUENCY 4600 TO 4700[MHz]
AND OUTPUT 23 [dBm]

F I G. 7A

| CONDITION ID | POSITION (LATITUDE LONGITUDE) | FREQUENCY [MHz] | OUTPUT [dBm] | TIME ZONE | TDD PATTERN |
|---|---|---|---|---|---|
| 1 | 35.459196N, 139.636106E | 4600~4700 | 15 | 8:00~19:00 | TDD2 (SEMI-SYNCHRONOUS) |
| 2 | 35.459196N, 139.636106E | 4600~4700 | 23 | 8:00~19:00 | TDD1 (SYNCHRONIZED) |

F I G. 7B

```
Permission condition {
[1, 35.459196N, 139.636106E, 4600, 4700, 15, 8:00, 19:00, TDD2]
[2, 35.459196N, 139.636106E, 4600, 4700, 23, 8:00, 19:00, TDD1]
}
```

F I G. 8
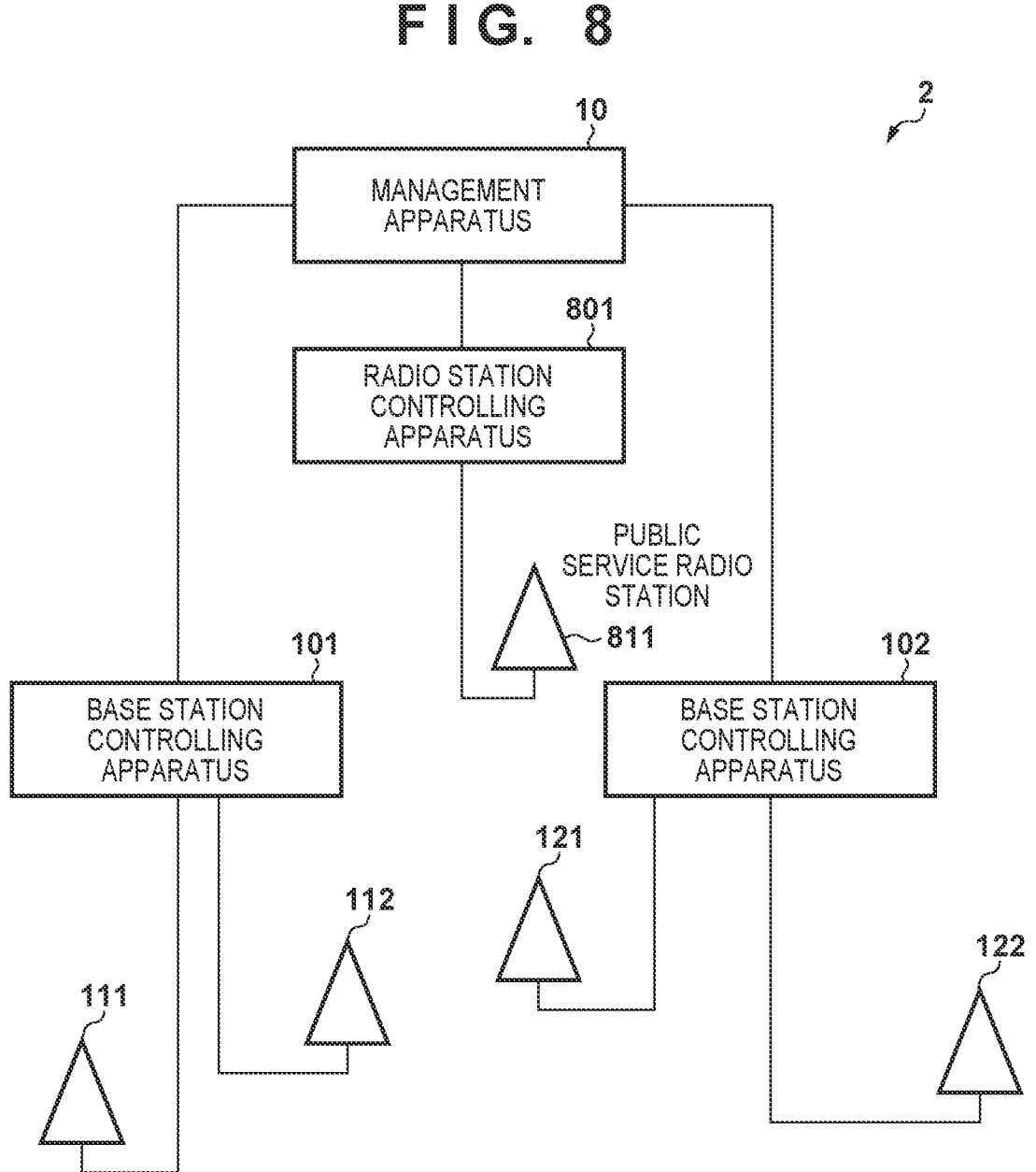

FIG. 9A

| PRIMARY USE ID | POSITION (LATITUDE LONGITUDE) | FREQUENCY [MHz] | OUTPUT [dBm] | TIME ZONE |
|---|---|---|---|---|
| 811 | 35.459280N, 139.636114E | 4720~4750 | 46 | 0:00~6:00 |

FIG. 9B

| SECONDARY USE ID | POSITION (LATITUDE LONGITUDE) | FREQUENCY [MHz] | OUTPUT [dBm] | TIME ZONE | TDD PATTERN |
|---|---|---|---|---|---|
| 111 | 35.459189N, 139.636098E | 4700~4800 | 23 | 8:00~19:00 | TDD2 (SEMI-SYNCHRONOUS) |
| 121 | 35.459202N, 139.636112E | 4600~4700 | 24 | CONSTANT | TDD1 (SYNCHRONIZED) |
| 122 | 35.459193N, 139.636123E | 4700~4800 | 27 | 6:00~19:00 | TDD1 (SYNCHRONIZED) |

F I G.  10
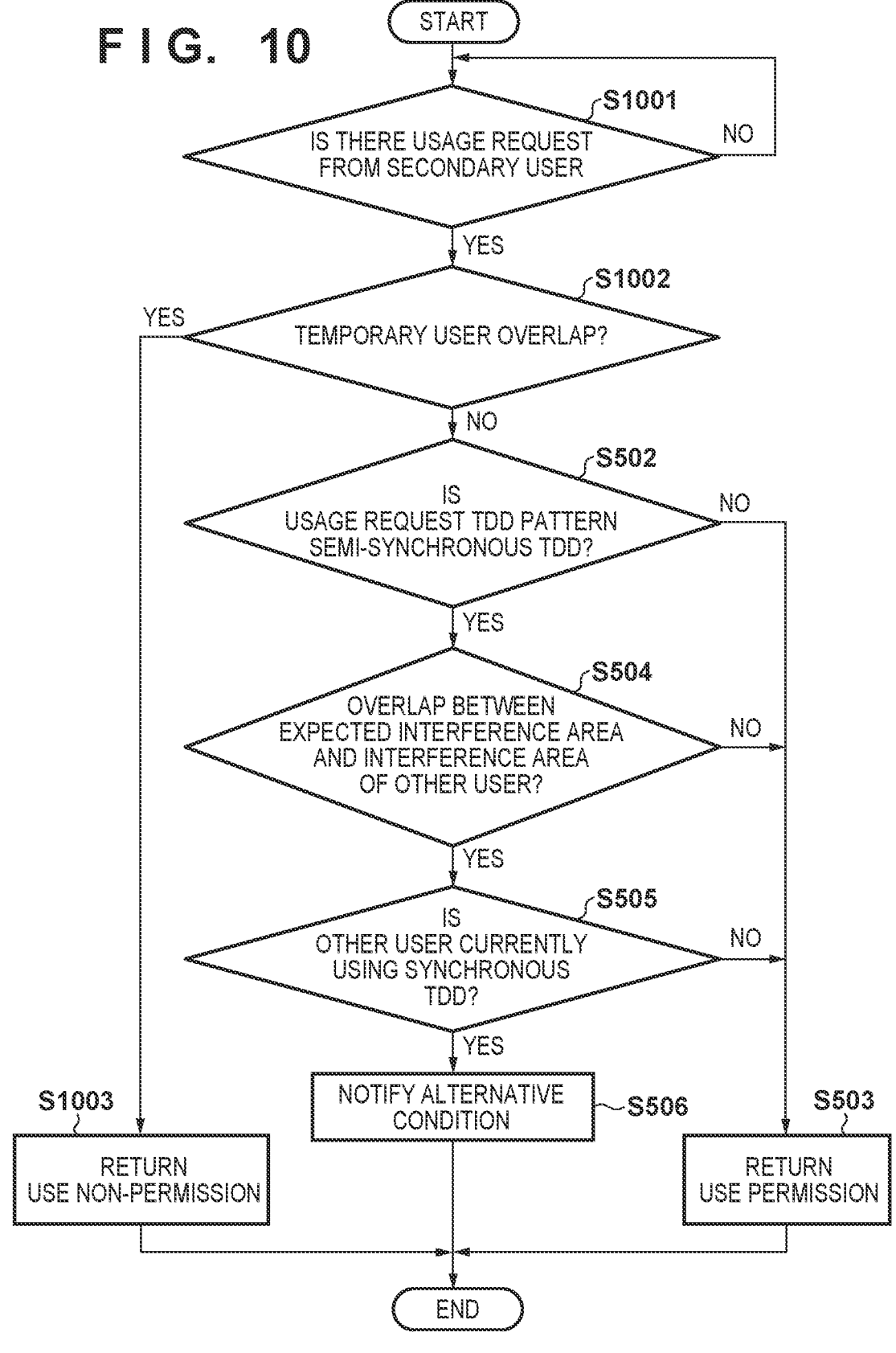

EXPECTED
INTERFERENCE AREA

COMMUNICATION AREA
OF BASE STATION 112

BASE STATION 112
35.459196N, 139.636106E

F I G. 12

| CONDITION | POSITION | FREQUENCY [MHz] | OUTPUT [dBm] | TIME ZONE | TDD PATTERN |
|---|---|---|---|---|---|
| 1-1 | 35.459189N, 139.636115E | 4700~4800 | 23 | 8:00~19:00 | TDD2 (SEMI-SYNCHRONOUS) |
| 1-2 | 35.459189N, 139.636115E | 4600~4700 | 23 | 8:00~19:00 | TDD1 (SYNCHRONIZED) |
| 2-1 | 35.459196N, 139.636106E | 4700~4900 | ~15 | 8:00~19:00 | TDD2 (SEMI-SYNCHRONOUS) |
| 2-2 | 35.459196N, 139.636106E | 4700~4800 | 23 | 17:00~19:00 | TDD2 (SEMI-SYNCHRONOUS) |
| 2-3 | 35.459196N, 139.636106E | 4800~4900 | 23 | 8:00~19:00 | TDD1 (SYNCHRONIZED) |
| 3-1 | 35.459196N, 139.636106E | 4600~4700 | ~10 | 8:00~12:00 | TDD1 (SYNCHRONIZED) |
| 4-1 | 35.459196N, 139.636106E | 4600~4700 | 23 | 18:00~19:00 | TDD2 (SEMI-SYNCHRONOUS) |

F I G. 13

| TIME SLOT NUMBER | CARRIER NETWORK TDD PATTERN | LOCAL NETWORK TDD PATTERN |
|---|---|---|
| 0 | D | D |
| 1 | D | D |
| 2 | D | D |
| 3 | S | S |
| 4 | U | U |
| 5 | U | U |
| 6 | D | D |
| 7 | D | S |
| 8 | D | U |
| 9 | D | U |
| 10 | D | D |
| 11 | D | D |
| 12 | D | D |
| 13 | S | S |
| 14 | U | U |
| 15 | U | U |
| 16 | D | D |
| 17 | D | S |
| 18 | D | U |
| 19 | D | U |

RADIO FRAME

MANAGEMENT APPARATUS, RESOURCE MANAGEMENT METHOD, AND NON-TRANSITORY COMPUTER-READABLE STORAGE MEDIUM

BACKGROUND OF THE INVENTION

Field of the Invention

The present invention relates to a management apparatus and a resource management method for a sharable frequency resource, and to a non-transitory computer-readable storage medium.

Description of the Related Art

In recent years, business operators other than carriers have been establishing and operating cellular communication networks, such as a local fifth generation mobile communication system (5G) and a regional Broadband Wireless Access (BWA). In view of this, rules and regulations have been under development for the use of sharable frequency resources.

The business operators (usage applicants) other than carriers transmit usage application information on a frequency resource desired to be used to a management apparatus. When the use is permitted, the frequency resource can be used by a base station (local network base station) installed by the usage applicant. In this case, due to a case such as communications by a local network base station being operated not synchronized with communications by a carrier network base station or another local network base station, the communications performed by the carrier network base station may interfere with the communications performed by the local network base station.

Japanese Patent Application Laid-Open No. 2020-188388 discloses a technique in which a management apparatus acquires usage application information from each base station of a telecommunications carrier, determines whether a TDD pattern can be allocated when a frequency resource of an adjacent carrier frequency is used, and determines the TDD pattern of each base station based on a result of the determination.

Unfortunately, with Japanese Patent Application Laid-Open No. 2020-188388, the usage applicant cannot determine whether to not use the frequency resource, or to transmit the usage request for the frequency resource again under another condition, when the usage request from the usage applicant cannot be fully satisfied. This leads to a problem in that a usage applicant is plagued by a poor usability regarding the use of a sharable frequency resource.

SUMMARY OF THE INVENTION

The present invention has been made in view of the above-described problem, and an object of the present invention is to provide a technique that can improve usability regarding the use of a sharable frequency resource.

In order to solve the problems described above, a management apparatus configured to manage a frequency resource that is sharable, the management apparatus comprises: at least one memory that stores a set of instructions; and at least one processor that executes the instructions, the instructions, when executed, causing the management apparatus to perform operations including: acquiring usage condition information on a usage condition for the frequency resource used by a first wireless communication network, and desired condition information on a condition under which a second wireless communication network desires to use the frequency resource; estimating, based on the usage condition information and the desired condition information, an impact imposed by a wireless communication in the second wireless communication network on a wireless communication in the first wireless communication network under an assumption that a wireless signal is transmitted in accordance with the desired condition information in the second wireless communication network; determining whether to permit use of the frequency resource corresponding to the desired condition information in the second wireless communication network, based on a result of the estimating; and notifying alternative condition information on a usage condition under which the frequency resource is usable, when the use of the frequency resource corresponding to the desired condition information is determined to be not permitted.

The present invention can provide a technique that can improve usability regarding the use of a sharable frequency resource.

Further features of the present invention will become apparent from the following description of exemplary embodiments (with reference to the attached drawings).

BRIEF DESCRIPTION OF THE DRAWINGS

FIG. 1 is a block diagram illustrating an example of a configuration of a wireless communication system 1 according to a first embodiment;

FIGS. 3A and 3B are diagrams illustrating examples of a configuration of a usage request message for a shared frequency;

FIG. 4 is a diagram illustrating information on a frequency resource being used, to be stored in a database of the management apparatus;

FIG. 6 is a diagram illustrating an area in which a signal intensity of a wireless signal transmitted from a base station of a usage applicant is of a predetermined value or greater;

FIGS. 7A and 7B are diagrams illustrating an alternative condition included in a response to the usage request message;

FIG. 8 is a block diagram illustrating an example of a configuration of a wireless communication system 2 according to a second embodiment;

FIGS. 9A and 9B are diagrams illustrating information on a frequency resource being used, to be stored in a database of the management apparatus;

FIG. 10 is a sequence diagram illustrating an example of processing executed by the management apparatus;

FIG. 12 is a diagram illustrating an alternative condition included in a response to the usage request message; and FIG. 13 is a diagram illustrating an example of a configuration of TDD time slots in a carrier network and a local network.

DESCRIPTION OF THE EMBODIMENTS

Figure 2:
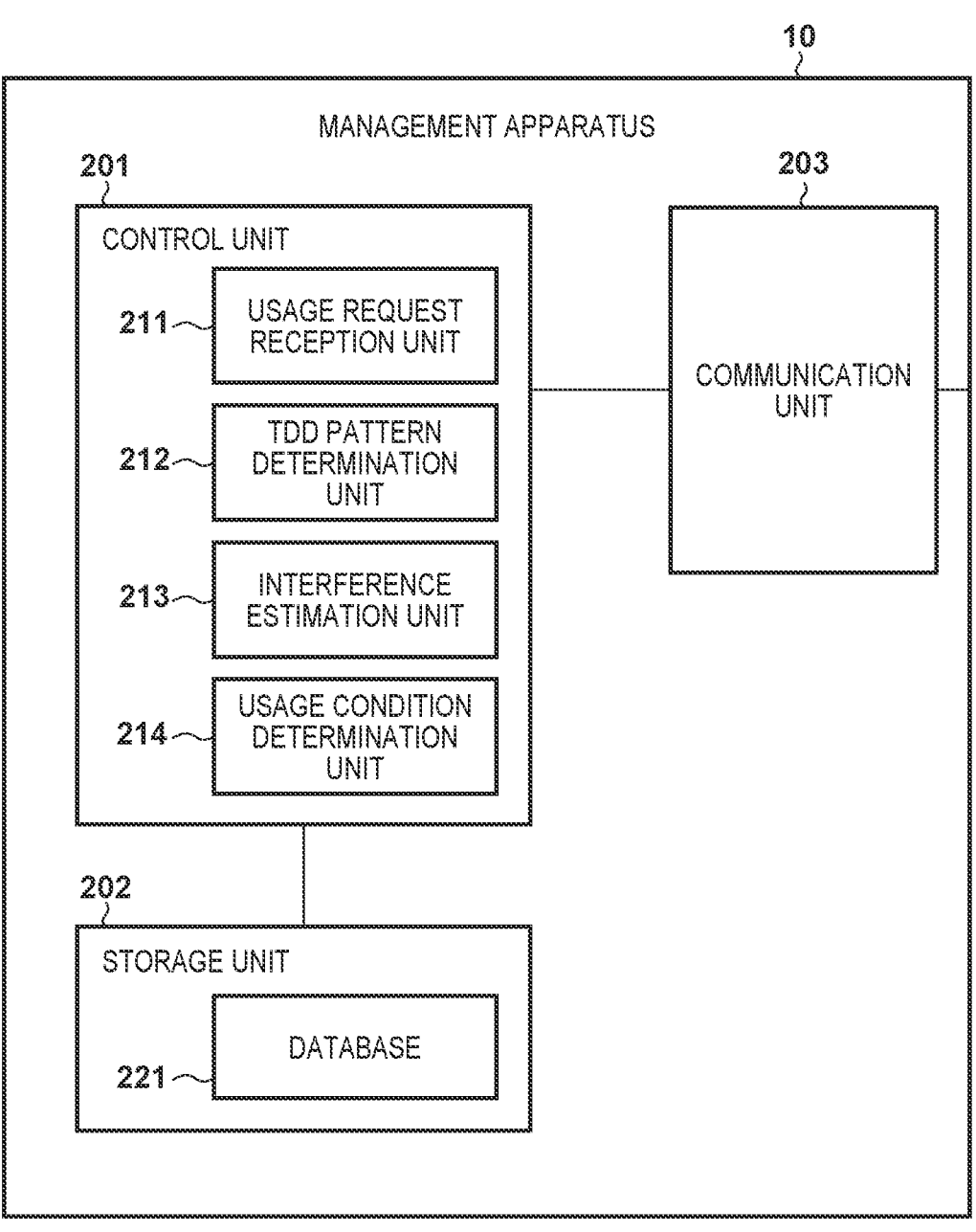
FIG. 2 is a block diagram illustrating an example of a configuration of a management apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following embodiments, a description will be given on a method of notifying a user of a parameter related to an available frequency resource when a user who desires to use a frequency resource cannot use the frequency resource as desired in a frequency sharing system.

First Embodiment

Figure 1:
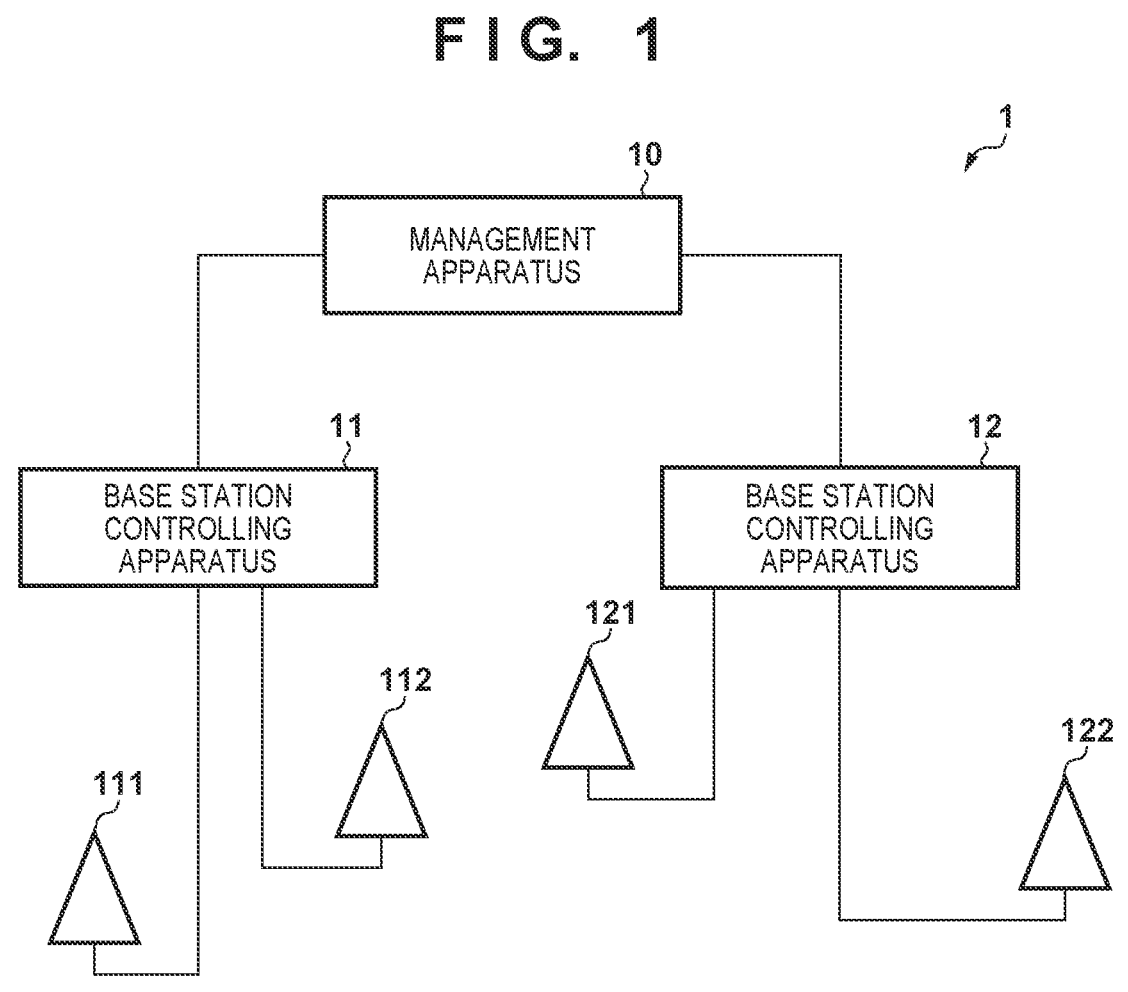

FIG. 1 is a system configuration example of a wireless communication system 1 which is a frequency sharing system according to the present embodiment. In the present embodiment, description will be given by assuming that a user who desires to use a frequency resource is a licensee of fifth generation mobile communication that establishes a spot local 5G network also referred to as local 5G. In FIG. 1, it is assumed that the number of licensees of the local 5G is two, and the number of base stations installed by each licensee is two.

The wireless communication system 1 includes, a management apparatus 10, a base station controlling apparatuses 11 and 12, and base stations 111, 112, 121, and 122.

The management apparatus 10 manages a sharable frequency resource, and determines whether the frequency resource can be used in response to a usage request from the base station controlling apparatus 11 or 12.

The base station controlling apparatuses 11 and 12 are controlling apparatuses for the local 5G that can communicate with the management apparatus 10 and base stations, and are assumed to be operated by different licensees in the present embodiment. In the following description, it is assumed that the base station controlling apparatus 11 is operated by a local 5G licensee A and the base station controlling apparatus 12 is operated by a local 5G licensee B.

The base stations 111, 112, 121, and 122 are wireless base stations controlled by a base station controlling apparatus. In the present embodiment, the base stations 111, 112, 121, and 122 are base stations forming a dedicated fifth generation mobile communication (5G) network installed by the local 5G licensees A and B. The base stations 111 and 112 are controlled by the base station controlling apparatus 11, and the base stations 121 and 122 are controlled by the base station controlling apparatus 12.

Although not illustrated in FIG. 1, a carrier network operated by a carrier of a cellular network is further provided separately from the local 5G network. In an area where wireless communications with a base station configured to provide a communication service of a carrier network can be executed, the wireless communication service is provided to a terminal apparatus of a user who has signed a contract with the wireless telecommunications carrier. Similarly, in a network provided by a local 5G base station, a wireless communication service is provided to a terminal apparatuses prepared for communications of the local network, in an area where wireless communications with the base station of the local network can be executed. In the present embodiment, the carrier network is assumed to be prioritized. Thus, communications of the local network are performed after being processed to impose no or sufficiently low level of interference on communications of the carrier network.

The communications of the carrier network and the communications of the local network may be carried out at independent timings. In this case, even if the communications of the carrier network and the local network are performed using, for example, orthogonal frequency division multiplexing (OFDM) that can guarantee mutual orthogonality, the orthogonality may fail to be guaranteed due to a mismatch in timings of radio frames, and then, mutual interference may occur. Such an interference can be suppressed by making the timings of the radio frames to match, by the local 5G base station transmitting and receiving the radio frames in synchronization with the base station of the carrier network, for example.

Note that, situations in which the mutual interference occurs may have a plurality of patterns. For example, the interference from the carrier network to the local network may include (1) interference from a base station of the carrier network to a base station of the local network, and (2) interference from a base station of the carrier network to a terminal apparatus of the local network. The interference from the carrier network to the local network may also include the following patterns: (3) interference from a terminal apparatus of the carrier network to a base station of the local network; and (4) interference from a terminal apparatus of the carrier network to a terminal apparatus of the local network. Possible interference from the local network to the carrier network may include (5) interference from a base station of the local network to a base station of the carrier network, and (6) interference from a base station of the local network to a terminal apparatus of the carrier network. Possible interference from the local network to the carrier network may further include (7) interference from a terminal apparatus of the local network to a base station of the carrier network, and (8) interference from a terminal apparatus of the local network to a terminal apparatus of the carrier network. Under these conditions, premised upon the local network being inferior to the carrier network, the interferences (1) to (4) are somewhat tolerable, and processing for reducing the impact of the interference can be performed in the local network. The interferences (5) to (8) are interferences to the prioritized network. Thus, in the local network, occurrence of such interference needs to be prevented, or the interference needs to be sufficiently suppressed.

In one example, the interference (5) can be sufficiently suppressed, with a base station of the local network transmitting a signal at a timing when a base station of the carrier network transmits a signal. The interferences (6) and (7) can be suppressed to be sufficiently small, by setting a frequency band of a signal transmitted and received by base stations of the carrier network and a frequency band of a signal transmitted and received by base stations of the local network to be different. The interference (8) can also be sufficiently suppressed, with a terminal apparatus of the local network transmitting a signal at a timing when a terminal apparatus of the carrier network transmits a signal.

In recent cellular communication standards, a time division duplex (TDD) scheme has been standardized in which a ratio between a downlink, in which a base station apparatus transmits a signal to a terminal apparatus, and an uplink, in which a terminal apparatus transmits a signal to a base station apparatus, can be flexibly changed. In general, since the demand for communications of the downlink is high, a large amount of time slots are likely to be allocated to the downlink in the carrier network. On the other hand, in the local network, a larger amount of time slots may be required for the uplink than in the carrier network, depending on the purpose of the network. In this case, time slots can be allocated to the uplink and the downlink in the local network independently from the allocation of time slots to the uplink and the downlink in the carrier network (see US-2020-0008087). Unfortunately, in this case, the interferences (5) and (8) described above may occur.

In view of this, the local network can be used with the allocation of the time slots in the carrier network being only partially changed. For example, a setting is possible in which only part of the slots allocated to the uplink in the carrier network is allocated to the downlink, with the slots, which have been allocated to the downlink in the carrier network, being used for the downlink without a change in the allocation. Furthermore, a setting is possible in which only part of the slots allocated to the downlink in the carrier network is allocated to the uplink, with the slots, which have been allocated to the uplink in the carrier network, being used for the uplink without a change in the allocation. With the former setting, the interference (8) can be suppressed because a terminal apparatus of the local network transmits no signal while the downlink communications are being performed in the carrier network. On the other hand, with the latter setting, the interference (5) can be suppressed because a base station of the local network transmits no signal while the uplink communications are being performed in the carrier network.

Now, a case will be considered where the setting free of the interference (5) is used for the sake of protection of a base station apparatus of the carrier network. FIG. 13 illustrates an example of the time slot setting in this case. In FIG. 13, "U" indicates a time slot allocated to the uplink communications, "D" indicates a time slot allocated to the downlink communications, and "S" indicates a time slot of a period of switching from the downlink to the uplink. Note that, communications, in which time slots are allocated in the local network through changing a communication direction (uplink or downlink) of part of the time slots allocated in the carrier network, may be referred to as semi-synchronous TDD communications (see US-2020-0008087). In the present embodiment, in particular, as illustrated in FIG. 13, communications using, in the local network, a TDD pattern in which a time slot allocated to the downlink among the time slots in the carrier network is set to be used for the uplink is referred to as semi-synchronous TDD. On the other hand, communications using, in the local network, a TDD pattern that is the same as that with a time slot allocated to the downlink among the time slots in the carrier network is referred to as synchronous TDD.

In the present embodiment, the base stations 111, 112, 121, and 122 are base stations of a TDD system, and an uplink (UL) and downlink (DL) communication schedule of each base station is operated by the synchronous TDD or the semi-synchronous TDD.

FIG. 2 is a block diagram illustrating an example of a configuration of the management apparatus 10. The management apparatus 10 includes a control unit 201, a storage unit 202, and a communication unit 203.

The control unit 201 is a control that controls the entirety of the management apparatus 10 by executing a control program stored in the storage unit 202. The storage unit 202 is a storage apparatus that stores various types of information such as the control program executed by the control unit 201.

The communication unit 203 is a communication unit configured to perform wireless communications with the base station controlling apparatuses 11 and 12.

The control unit 201 executes the control program stored in the storage unit 202 to operate as a usage request reception unit 211, a TDD pattern determination unit 212, an interference estimation unit 213, and a usage condition determination unit 214.

The usage request reception unit 211 receives a usage request for a frequency resource from the base station controlling apparatuses 11 and 12.

The TDD pattern determination unit 212 is a TDD pattern determination unit configured to determine a TDD communication schedule (TDD pattern) from the usage request received from the base station controlling apparatuses 11 and 12.

The interference estimation unit 213 estimates the interference between service areas formed by base stations that use frequency resources, and estimates the level of impact imposed by the use of the frequency resource by the base station, on the other wireless communication network, in accordance with the usage request received.

The usage condition determination unit 214 determines whether to permit the use of the frequency resource according to the usage request. When the use of the frequency resource according to the usage request is determined not to be permitted, whether there is an alternative frequency resource that can be used is determined.

A database 221 stores information on a sharable frequency resource and information on a frequency resource being used.

When the use of the shared frequency resource is desired by the base station 112 in FIG. 1, the base station controlling apparatus 11 transmits a usage request message (desired condition information) including information illustrated in FIG. 3A to the management apparatus 10. The usage request message includes information on an identifier (ID) of a base station desired to be used, a position of the base station, a frequency desired to be used, an output (transmission power), a time zone (date and time of the use), and a TDD pattern. The example of the FIG. 3A indicates that the base station 112 located at a position "(latitude) 35.459196N, (longitude) 139.636106E" is desiring to use a frequency resource under the semi-synchronous TDD pattern, with the output 23 dBm, in the time zone of 8:00 to 19:00, and in a frequency band from 4600 to 4700 MHz. With the usage request message, the desired condition information may be transmitted in a format of a mark-up language as illustrated in FIG. 3B.

The database 221 of the management apparatus 10 holds information on the base stations 111, 121, and 122 using the frequency resource and information on the frequency resource used by these base stations (usage condition information) as illustrated in FIG. 4. Also for the information on the base station using the frequency resource, the database 221 stores the identifier and the position of the base station, the frequency of the frequency resource being used, the output, the time zone, and the TDD pattern, as in FIG. 3A.

Figure 5:
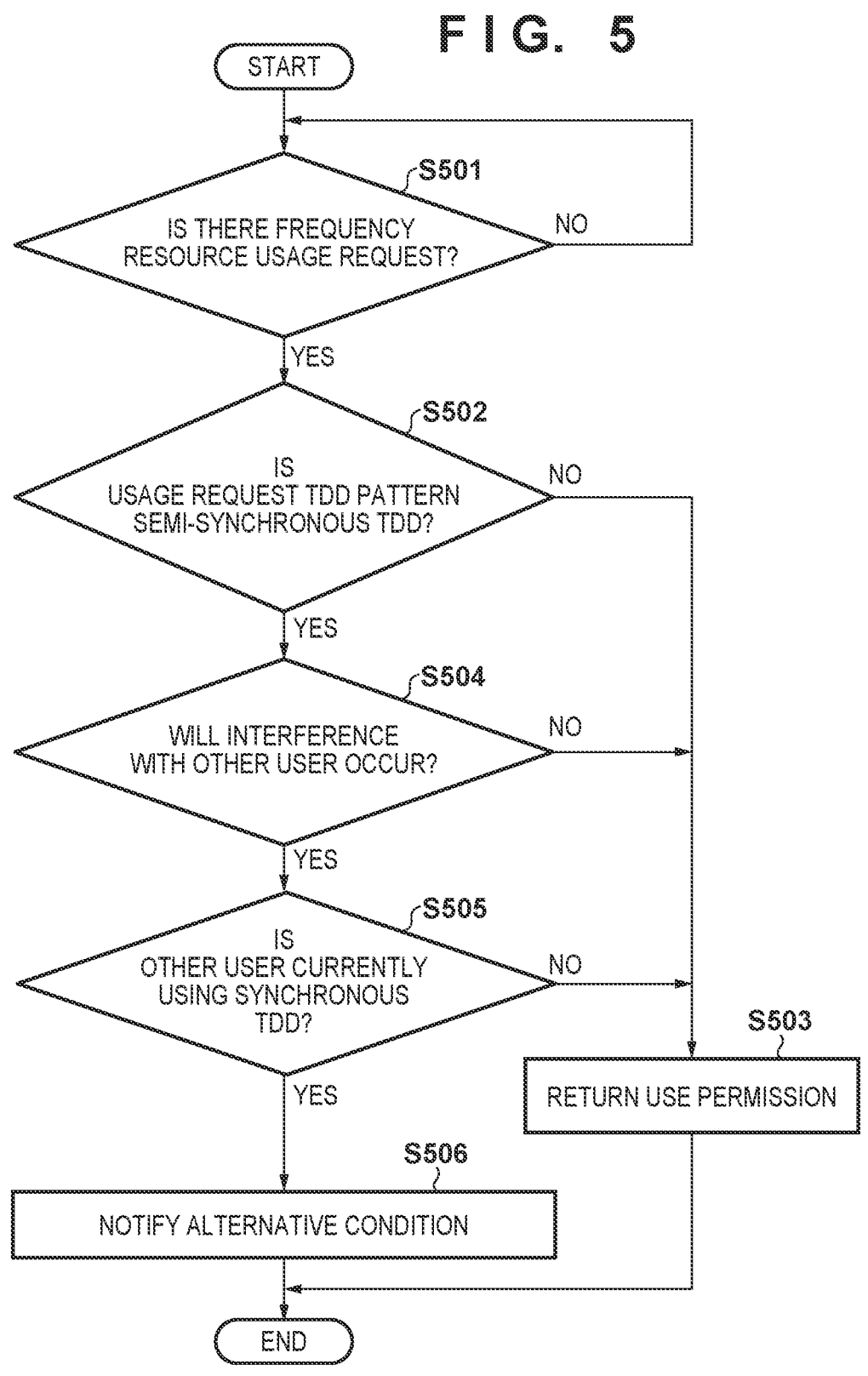
FIG. 5 is a sequence diagram illustrating an example of processing executed by the management apparatus.

FIG. 5 is a flowchart illustrating a resource management method including notifying information (alternative condition information) on an available frequency resource when the usage applicant is not permitted to use the frequency resource under the condition according to the usage request in the wireless communication system 1 according to the present embodiment. The processing in FIG. 5 is executed by the management apparatus 10 at a predetermined time interval.

In a processing step S501 (also referred to as S501. the same applies to the subsequent processing steps), the management apparatus 10 waits for a sharable frequency resource usage request from each local 5G licensee. When the management apparatus 10 receives the usage request, the management apparatus 10 determines whether the TDD pattern according to the received usage request is the semi-synchronous TDD (S502).

When the TDD pattern in the received usage request is not the semi-synchronous TDD (No in S502), the base station does not interfere with a base station of the carrier network. Thus, a message indicating that the desired use is permitted is returned (S503).

When the TDD pattern in the usage request received is the semi-synchronous TDD (Yes in S502), the management apparatus 10 advances the processing to S504, to determine whether the use of the frequency resource by the usage applicant under the condition according to the usage request will cause an occurrence of interference to another wireless communication network.

Figure 6:
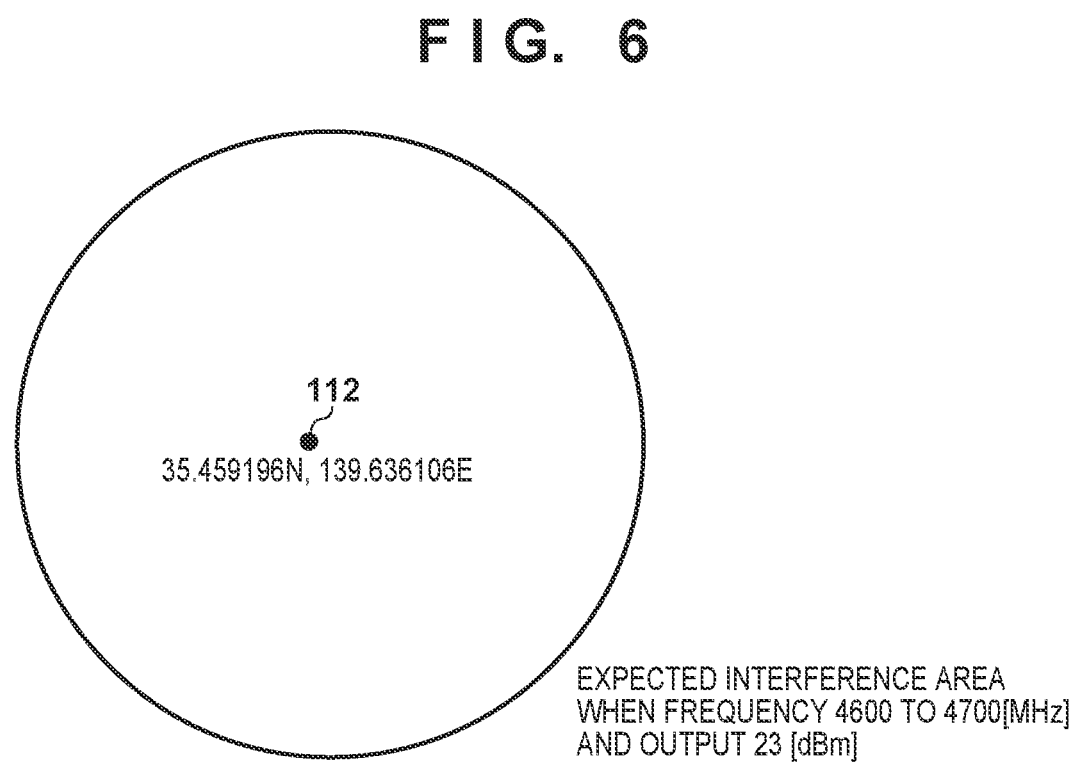

The determination in S504 includes estimating an area (expected interference area) in which a signal intensity of a wireless signal is expected to be of a predetermined value or greater, in a case where the base station 112 is assumed to transmit the wireless signal in accordance with the position, the frequency, and the output of the base station 112 corresponding to the usage request, as illustrated in FIG. 6. For example, it can be expected that a circular expected interference area will be produced, based on the output, around a point where the base station 112 is positioned. As an example, when the base station 112 uses a directional antenna, information indicating an antenna directivity of the base station 112 may be included in the usage request from the base station 112, so that the shape of the expected interference area can be estimated based on the antenna directivity.

Similarly, for the base station that is already using the frequency resource, an area (interference area) in which the signal intensity of a wireless signal is expected to be of a predetermined value or greater is estimated. Then, it is determined whether the interference area of the already operating base station and the expected interference area of the base station according to the usage request overlap, and it is determined that interference will occur when the areas overlap. In addition, in a case where the time zone in which the use is desired is limited, when the use time does not overlap with that of the base station already using the frequency resource, it may be determined that the interference will not occur even if the interference area and the expected interference area overlap.

When it is determined from the estimation result that interference between the usage applicant and other users will not occur (No in S504), the management apparatus 10 returns a message, indicating a permission to use the frequency resource under the condition (desired condition) for the frequency resource according to the usage request, to the base station controlling apparatus 11 (S503).

When it is determined from the estimation result that interference between the usage applicant and the other users will occur (Yes in S504), the management apparatus 10 advances the processing to S505 and determines whether there is a base station operating in synchronous TDD among the other users with which the interference is determined to occur.

When it is determined that there are no base station operating in synchronous TDD (No in S505), it means that the other users with whom it is determined the interference will occur are also using with the semi-synchronous pattern. Thus, it is determined that interference, which is caused by the usage applicant and the other user operating in different TDD patterns, that is, the synchronous pattern and the semi-synchronous pattern, will not occur, whereby a message permitting the desired use is returned (S503).

When it is determined that there is a base station operating in synchronous TDD (Yes in S505), the management apparatus 10 notifies the usage applicant of a condition (alternative condition) related to an available frequency resources (S506).

The alternative condition is information having contents illustrated in FIG. 7A. That is, a position, a frequency, an output, a time zone, and a TDD pattern are notified in association with the identifier of the notified condition. The information is expressed using a mark-up language as illustrated in FIG. 7B as the data format.

For example, in a condition with ID=1, the output is 15 dBm, as compared to the usage request illustrated in FIG. 3A. Thus, the management apparatus 10 notifies that in a case of the condition with ID=1, the use is permitted when the output is reduced from the output according to the usage request. The management apparatus 10 notifies that in a case of the condition with ID=2, the use is permitted when the TDD pattern according to the usage request is changed to the synchronous TDD pattern.

As described above, in a case where the frequency resource cannot be used under the usage condition included in the usage request from the usage applicant due to the use status of another user, it is possible to provide information on an alternative for the determination by the usage applicant. With this configuration, the local 5G licensee can determine whether or not to request again for the use of the frequency resource by the base station 112 under an alternative condition, whereby the usability of the usage applicant using the sharable frequency resource can be improved.

Second Embodiment

In the first embodiment, a description is given on a case where the wireless communication system 1 includes the base stations 111, 112, 121, and 122 that are local 5G base stations and these base stations share frequency resources. In a second embodiment, a description will be given on how frequency resources are shared in a wireless communication system 2 further including a public service radio base station. Note that the same configurations, functions, and processing as those of the first embodiment are denoted by the same reference numerals and the description thereof is omitted.

FIG. 8 is a diagram illustrating a configuration of the wireless communication system 2 according to the present embodiment. As in the first embodiment, the wireless communication system 2 includes the management apparatus 10, the base station controlling apparatuses 11 and 12, and the base stations 111, 112, 121, and 122. In the present embodiment, the wireless communication system 2 further includes a radio station controlling apparatus 801 and a public service radio station 811.

In FIG. 8, as in the first embodiment, it is assumed that the number of local 5G licensees, that is, the number of base control stations, is two, and the number of base stations installed by each licensee is two. It is further assumed that a number of the radio station controlling apparatus 801, installed by the business operator that is an operator of the public service radio, is one, and a number of the public service radio station 811, controlled by the radio station controlling apparatus 801, is one.

A frequency of 4600 to 4800 MHz, which is the same as that used for the local 5G, is used for the public service radio. Thus, while the frequency is being used for the public service radio, the use of the frequency is halted in the local 5G, to prevent interference on the public service radio. Thus, the public service radio is defined as a communication scheme of a primary user, and the local 5G is defined as a communication scheme of a secondary user, with the use of the frequency resource by the primary user prioritized over the use of the frequency resource by the secondary user. The public service radio station 811 is controlled by the radio station controlling apparatus 801. The radio station controlling apparatus 801 can communicate with the management apparatus 10.

In the present embodiment, as will be described below with reference to FIGS. 9A and 9B, it is assumed that the public service radio station 811 and the base stations 111, 121, and 122 are using the frequency resources.

The configuration of the management apparatus 10 is similar to that in the first embodiment described with reference to FIG. 2, and thus the description thereof will be omitted. When the base station 112 that is a local 5G base station desires to use the shared frequency, the base station controlling apparatus 11 transmits a message including the information with the contents as illustrated in FIG. 3A to the management apparatus 10.

In the database 221 of the management apparatus 10, information as illustrated in FIG. 9B on the base stations 111, 121, and 122 already operating is stored, and information as illustrated in FIG. 9A on the public service radio station 811 is stored. Specifically, for the public service radio that is the primary user, information on the identifier and the position of the base station, as well as the frequency of the frequency resource being used, the output, and the time zone is stored in the database 221. For the local 5G that is the secondary user, information on the identifier and the position of the base station that is operating, as well as the frequency of the frequency resource being used, the output, the time zone, and the TDD pattern is stored in the database 221.

FIG. 10 is a flowchart illustrating a resource management method for providing information on an available frequency resource, when the use of the frequency resource under the condition according to the usage request from the secondary usage applicant is not permitted. The flowchart illustrated in FIG. 10 is executed by the management apparatus 10.

In the S1001, the management apparatus 10 waits for a usage request for a shared frequency from each local 5G licensee that is the secondary user. In the present embodiment, a description is given assuming that the usage request for the frequency resource related to the base station 112 as described above with reference to FIG. 3A, is received from the base station controlling apparatus 11. When the usage request is received (Yes in S1001), the management apparatus 10 determines whether an interference with a public service radio system that is the primary user occurs (S1002).

Figure 11:
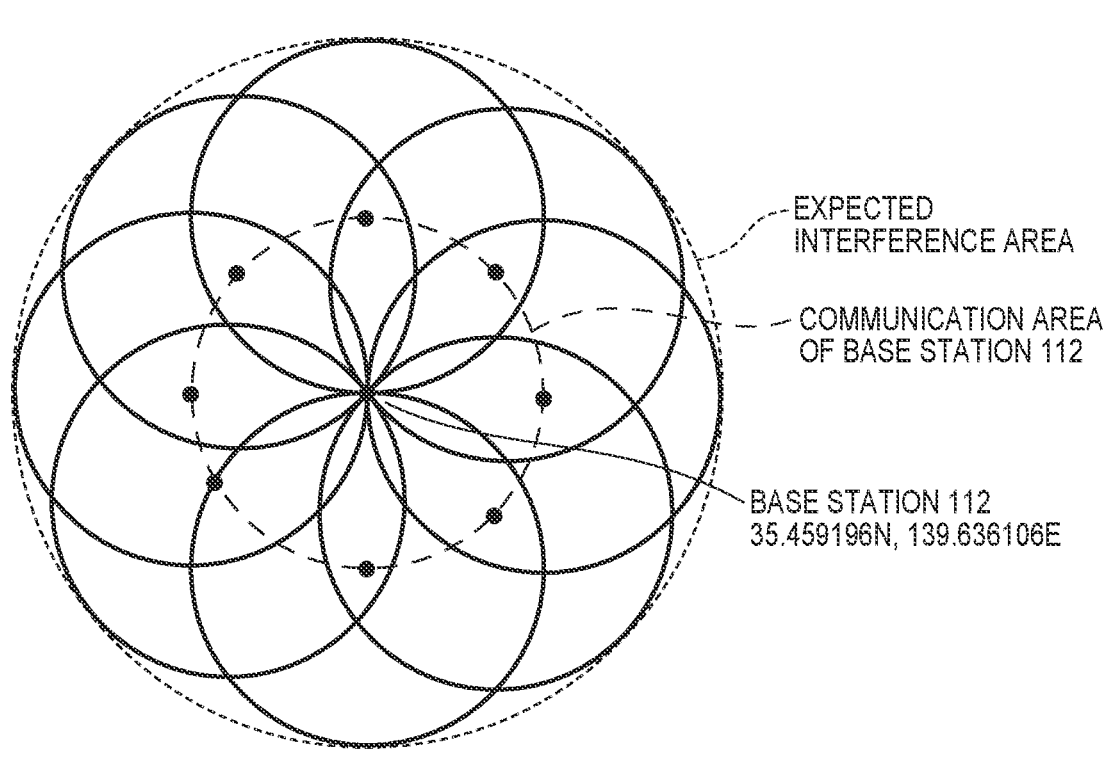
FIG. 11 is a diagram illustrating an area in which a signal intensity of a wireless signal transmitted in a wireless network of the usage applicant is of a predetermined value or greater.

The determination in S1002 is performed as follows. Specifically, first of all, from the position, the frequency, and the output of the base station that has issued the usage request, a communication area of the base station 112 at the frequency as indicated by a dashed line in FIG. 11 is estimated. When it is assumed that terminals are present at each point (communication area end) on the dashed line, an area, in which the signal intensity of a wireless signal transmitted by the terminal is of a predetermined value or greater, is obtained as indicated by a solid in the figure. In this case, the frequency is the same between the terminal and the base station, and the maximum value of the output of the terminal is assumed to be 23 dBm that is a terminal output defined in the 3GPP standard. Then, the expected interference area is estimated by a dotted line obtained by connecting the solid lines. In the expected interference area, the wireless signal transmitted in the wireless communication network provided by the base station 112 may generate interference with another wireless communication network. Then, from the position, the frequency, and the output of the public service radio station 811 that is the primary user, it is determined whether an interference occurs depending on whether the area overlaps with the interference area obtained as in FIG. 6 in the first embodiment. When a desired use time zone is limited, overlap of use times may be additionally taken into consideration.

When the management apparatus 10 determines that the use of the base station 112 of the frequency resource according to the usage request received generates an interference (Yes in S1002), the use by the public service radio that is the primary user is prioritized. Thus, the management apparatus 10 returns a message for notifying that the use of the frequency resource is not permitted to the base station 112 that is the secondary user (S1003).

When it is determined that the use of the frequency resource according to the received usage request generates an interference with another wireless communication network (No in S1002), it is determined whether the TDD pattern in the usage request is the semi-synchronous TDD pattern (S502). The processing after S502 is similar to that in the first embodiment described with reference to FIG. 5, and thus the description thereof will be omitted.

Note that the alternative condition notified in S506 is information having contents as illustrated in FIG. 12. Here, a condition is notified indicating that the use can be permitted by changing one or more terms in the usage request.

As described above, when the use of the frequency resource according to the usage request of the base station 112 is not permitted due to the use status of another secondary user, even in a case where there is no overlap in use of the frequency resource with the primary user, the information on an alternative condition different from the condition according to the usage request is provided. Thus, the information can be provided for determining whether to use the frequency resource under the alternative condition, when the usage request is rejected. With this configuration, the local 5G licensee operating the base station 112 can determine, based on the information provided, whether or not to desire the use of the base station 112 under the alternative condition.

Third Embodiment

In the first embodiment, the processing is described in which when a new usage request is received, the management apparatus 10 determines whether to give permission for the usage request, and when the permission is not given for the usage request, the management apparatus 10 notifies the base station controlling apparatus 11 that has transmitted the usage request of an alternative condition.

However, in some cases, such as when the management apparatus 10 receives a usage request for a frequency resource of a public service radio network, the wireless communication network according to the usage request may be prioritized over the wireless communication network using the frequency resource. There may be a case where priorities are set between a plurality of local 5G networks.

Processing by the management apparatus in such a case will be described with reference to FIG. 5.

The management apparatus 10 according to the present embodiment also manages information on the priority of the base station using the frequency resource, in the database 221. The management apparatus 10 acquires information enabling identification of the priority of the wireless communication network provided by the base station according to the usage request.

Then, when it is determined in S504 in FIG. 5 that there is an overlap between an interference area of other users and the expected interference area assuming the use of the frequency resource in accordance with the usage request, the priority of the wireless communication network using the frequency resource is compared with the priority of the wireless communication network according to the usage request. When the priority of the wireless communication network using the frequency resource is low, the base station controlling apparatus of the wireless communication network with the low priority is notified of an alternative condition for the frequency resource. For example, an instruction to reduce the output intensity of the wireless signal is transmitted. Alternatively, an instruction to change the usage condition of the frequency resource that is already used, such as switching the TDD pattern or changing the frequency, is issued. In this case, a use permission message may be transmitted for the usage request for the frequency resource from the wireless communication network with a higher priority. Thus, when a base station with a low priority is using the frequency resource, the operation of the base station with a low priority can be changed so as not to interfere with a base station with a high priority according to the usage request.

In the present embodiment, the usage conditions for a plurality of frequency resources used by a plurality of base stations may be changed in response to a single usage request. For example, in response to a usage request for a frequency resource from a wireless communication network with a higher priority, usage conditions for frequency resources, used by a plurality of other wireless communication networks interfering with the wireless communication network according to the usage request, may be changed.

With this configuration, the management apparatus can flexibly manage the use of a shared frequency resource, where by usability can be improved in a case where a usage applicant uses a sharable frequency resource.

Other Embodiments

In one example, when the permission is not given to the usage request, the management apparatus 10 may select alternative condition information to be notified, in accordance with the performance of the base station according to the usage request. For example, in receiving usage request including information enabling identification of movement capability such as information indicating whether the base station is movable, it can be selected whether to notify alternative condition information including information indicating the position that is different from that in the usage request.

Furthermore, in receiving a usage request including information enabling identification of wireless capability of a base station such as a wireless signal output intensity of the base station and a frequency usable by the communication unit for the output, alternative condition information indicating a frequency, an output, and a TDD pattern different from those in the usage request is notified. For example, for a usage request from a base station that can transmit and receive a wireless signal only at a frequency from 4600 to 4700 MHz, alternative condition information indicating a frequency resource at a frequency from 4700 to 4800 MHz is not notified. With this configuration, no inappropriate information is transmitted to a usage applicant that makes the determination on the alternative condition information. Thus, usability can be improved for the usage applicant that makes the determination on the alternative condition information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-202771, filed Dec. 14, 2021, which is hereby incorporated by reference herein in its entirety.

What is claimed is:

1. A management apparatus configured to manage a frequency resource that is sharable, the management apparatus comprising:

at least one memory that stores a set of instructions; and at least one processor that executes the instructions, the instructions, when executed, causing the management apparatus to perform operations including:

acquiring usage condition information on a usage condition for the frequency resource used by a first wireless communication network, and desired condition information on a condition under which a second wireless communication network desires to use the frequency resource;

estimating, based on the usage condition information and the desired condition information, an impact imposed by a wireless communication in the second wireless communication network on a wireless communication in the first wireless communication network under an assumption that a wireless signal is transmitted in accordance with the desired condition information in the second wireless communication network;

determining whether to permit use of the frequency resource corresponding to the desired condition information in the second wireless communication network, based on a result of the estimating; and notifying alternative condition information on a usage condition under which the frequency resource is usable, when the use of the frequency resource corresponding to the desired condition information is determined to be not permitted, wherein the estimating includes:

estimating a first area in which a wireless signal transmitted in the first wireless communication network in accordance with the usage condition information is of a first value or greater; and estimating a second area in which, assuming that a wireless signal is transmitted in the second wireless communication network in accordance with the desired condition information, signal intensity of the wireless signal is of a second value or greater, and the determining includes determining to permit the second wireless communication network to use the frequency resource corresponding to the desired condition information, when the first area and the second area overlap, and when a TDD communication schedule according to the desired condition information is identical with a TDD communication schedule in the second area.

2. A resource management method executed by a management apparatus configured to manage a frequency resource that is sharable, the resource management method comprising:

acquiring usage condition information on a usage condition for the frequency resource used by a first wireless communication network, and desired condition information on a condition under which a second wireless communication network desires to use the frequency resource;

estimating, based on the usage condition information and the desired condition information, an impact imposed by a wireless communication in the second wireless communication network on a wireless communication in the first wireless communication network under an assumption that a wireless signal is transmitted in accordance with the desired condition information in the second wireless communication network;

determining whether to permit use of the frequency resource corresponding to the desired condition information in the second wireless communication network, based on a result of the estimating; and notifying alternative condition information on a usage condition under which the frequency resource is usable, when the use of the frequency resource corresponding to the desired condition information is determined to be not permitted, wherein the estimating includes:

estimating a first area in which a wireless signal transmitted in the first wireless communication network in accordance with the usage condition information is of a first value or greater; and estimating a second area in which, assuming that a wireless signal is transmitted in the second wireless communication network in accordance with the desired condition information, signal intensity of the wireless signal is of a second value or greater, and the determining includes determining to permit the second wireless communication network to use the frequency resource corresponding to the desired condition information, when the first area and the second area overlap, and when a TDD communication schedule according to the desired condition information is identical with a TDD communication schedule in the second area.

3. The resource management method according to claim 2, wherein the acquiring includes acquiring information related to a frequency of a frequency resource being used, transmission power, a date and time of use, and a communication schedule of time division duplex (TDD) as the usage condition information.

4. The resource management method according to claim 2, wherein the desired condition information includes information enabling identification of a position of a base station of the first wireless communication network, a frequency of a frequency resource requested to be used, transmission power, a date and time of use, and a communication schedule of time division duplex (TDD).

5. The resource management method according to claim 4, wherein the notifying includes notifying the alternative condition information including instruction of transmission power lower than the transmission power included in the desired condition information.

6. The resource management method according to claim 4, wherein the notifying includes notifying the alternative condition information including an instruction of a TDD communication schedule, a frequency, and a use date and time one of which is different from a corresponding one of the TDD communication schedule, the frequency, and the use data and time included in the desired condition information.

7. The resource management method according to claim 4, wherein the notifying includes notifying the alternative condition information including a usage condition for a plurality of frequency resources.

8. The resource management method according to claim 4, wherein the acquiring includes acquiring information enabling identification of at least one of movement capability and wireless capability of a base station of the first wireless communication network, and the notifying includes selecting the alternative condition information based on at least one of the movement capability and the wireless capability of the base station of the first wireless communication network acquired in the acquiring.

9. The resource management method according to claim 4, wherein the estimating includes:

estimating a first area in which a wireless signal transmitted in the first wireless communication network in accordance with the usage condition information is of a first value or greater;

estimating a second area in which, assuming that a wireless signal is transmitted in the second wireless communication network in accordance with the desired condition information, signal intensity of the wireless signal is of a second value or greater; and estimating an impact imposed by a wireless communication in the second wireless communication network on a wireless communication in the first wireless communication network, based on the first area and the second area.

10. The resource management method according to claim 9, wherein the desired condition information includes information on an antenna directivity of the base station of the second wireless communication network, and the estimating includes estimating the second area based on the antenna directivity of the base station of the second wireless communication network.

11. The resource management method according to claim 9, wherein the estimating includes estimating, assuming that a terminal apparatus that transmits a wireless signal is at an end of a communication area of the base station of the second wireless communication network, the second area including an area in which signal intensity of the wireless signal transmitted by the terminal apparatus is of a predetermined value or greater.

12. The resource management method according to claim 11, wherein the estimating includes assuming an antenna directivity of the terminal apparatus, and estimating the second area further based on the assumed antenna directivity of the terminal apparatus.

13. The resource management method according to claim 2, wherein the first wireless communication network and the second wireless communication network are local fifth generation mobile communication networks.

14. A resource management method executed by a management apparatus configured to manage a frequency resource that is sharable, the resource management method comprising:

acquiring usage condition information on a usage condition for the frequency resource used by a first wireless communication network, and desired condition information on a condition under which a second wireless communication network desires to use the frequency resource;

estimating, based on the usage condition information and the desired condition information, an impact imposed by a wireless communication in the second wireless communication network on a wireless communication in the first wireless communication network under an assumption that a wireless signal is transmitted in accordance with the desired condition information in the second wireless communication network;

determining whether to change an operation of the frequency resource corresponding to the usage condition information by the first wireless communication network, based on a result of the determining; and notifying alternative condition information on a usage condition under which the frequency resource is usable, when the operation of the frequency resource corresponding to the usage condition information is determined to be changed, wherein the estimating includes:

estimating a first area in which a wireless signal transmitted in the first wireless communication network in accordance with the usage condition information is of a first value or greater; and estimating a second area in which, assuming that a wireless signal is transmitted in the second wireless communication network in accordance with the desired condition information, signal intensity of the wireless signal is of a second value or greater, and the determining includes determining not to change the operation of the frequency resource corresponding to the usage condition information by the first wireless communication network, when the first area and the second area overlap, and when the TDD communication schedule according to the desired condition information is identical with a TDD communication schedule in the second area.

15. A non-transitory computer-readable storage medium storing instructions for causing a management apparatus, configured to manage a frequency resource that is sharable, to execute a resource management method including:

acquiring usage condition information on a usage condition for the frequency resource used by a first wireless communication network, and desired condition information on a condition under which a second wireless communication network desires to use the frequency resource;

estimating, based on the usage condition information and the desired condition information, an impact imposed by a wireless communication in the second wireless communication network on a wireless communication in the first wireless communication network under an assumption that a wireless signal is transmitted in accordance with the desired condition information in the second wireless communication network;

determining whether to permit use of the frequency resource corresponding to the desired condition information in the second wireless communication network, based on a result of the estimating; and notifying alternative condition information on a usage condition under which the frequency resource is usable, when the use of the frequency resource corresponding to the desired condition information is determined to be not permitted, wherein the estimating includes:

estimating a first area in which a wireless signal transmitted in the first wireless communication network in accordance with the usage condition information is of a first value or greater; and estimating a second area in which, assuming that a wireless signal is transmitted in the second wireless communication network in accordance with the desired condition information, signal intensity of the wireless signal is of a second value or greater, and the determining includes determining not to change the operation of the frequency resource corresponding to the usage condition information by the first wireless communication network, when the first area and the second area overlap, and when the TDD communication schedule according to the desired condition information is identical with a TDD communication schedule in the second area.

* * * * *